A. M. EATON.
PNEUMATIC RETRIEVING TROLLEY.
APPLICATION FILED SEPT. 27, 1915.

1,220,323.

Patented Mar. 27, 1917.
2 SHEETS—SHEET 1.

Witness
C. C. Holly

Inventor
Albert M. Eaton
by James R. Townsend

A. M. EATON.
PNEUMATIC RETRIEVING TROLLEY.
APPLICATION FILED SEPT. 27, 1915.
1,220,323.
Patented Mar. 27, 1917.
2 SHEETS—SHEET 2.
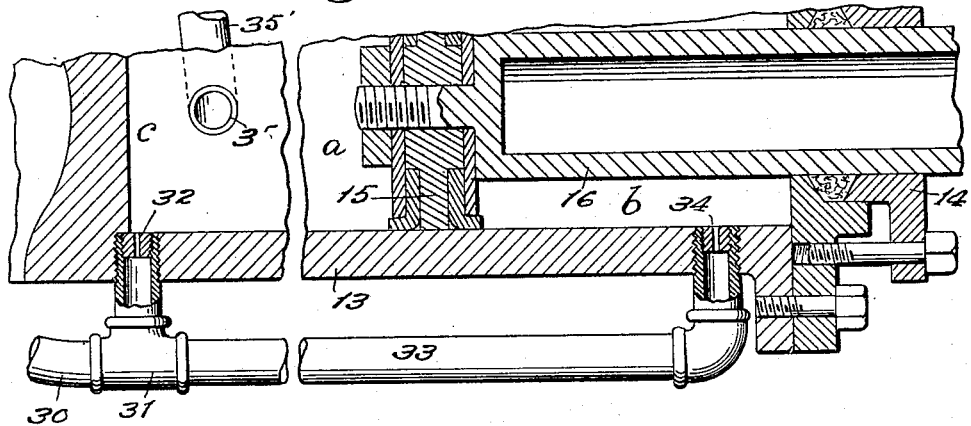
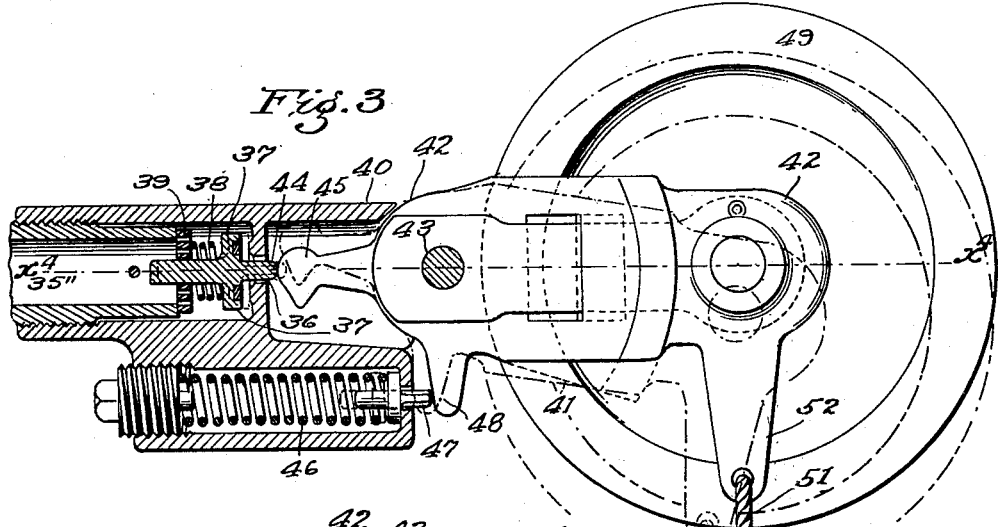
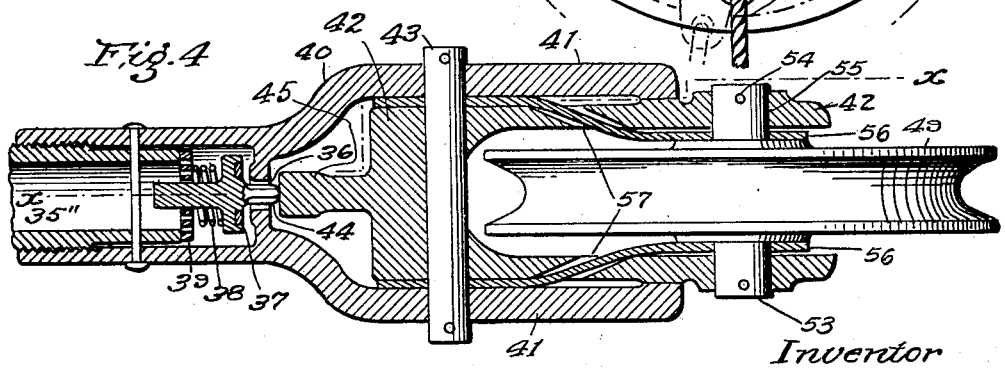
Witness
C. C. Holly
Inventor
Albert M. Eaton
by James R. Townsend
his atty.

UNITED STATES PATENT OFFICE.

ALBERT M. EATON, OF SANTA MONICA, CALIFORNIA.

PNEUMATIC RETRIEVING-TROLLEY.

1,220,323.  Specification of Letters Patent.  Patented Mar. 27, 1917.

Application filed September 27, 1915. Serial No. 52,959.

*To all whom it may concern:*

Be it known that I, ALBERT M. EATON, a citizen of the United States, residing at Santa Monica, in the county of Los Angeles and State of California, have invented a new and useful Pneumatic Retrieving-Trolley, of which the following is a specification.

An object of this invention is to provide a retrieving trolley for electric cars which will quickly withdraw the trolley wheel from the level of the trolley wire and span wires whenever the trolley wheel is relieved from its pressure against the trolley wire so that in case the trolley wheel runs off of the wire or the trolley wire becomes broken, the trolley pole and wheel will be automatically drawn down with a practically instantaneous action so they will not strike the span wires.

A further object of the invention is to accomplish the foregoing operation with a smooth and well controlled action so that the trolley pole will be lowered without jerk or jar and without damage to the pole or the car.

Further objects are cheapness, simplicity, ease of installation, and freedom from getting out of order.

The invention is regarded as pioneer in that an air-controlling valve is located at the upper end of a jointed trolley pole and is controlled by the mechanical movement of the upper joint or trolley harp so that the initial downward movement of the pole is practically instantaneous. Another pioneer feature resides in the air check arrangement whereby the retraction of the trolley pole is rapid at the instant the trolley wheel is de-wired and diminishes as the pole descends changing from a downward thrust upon the pole to a resilient support therefor all of which is accomplished by the same source of air that is depended upon to support the trolley pole in its running position.

Other objects and advantages and features of novelty may appear from inspection of the drawings and from the subjoined detailed description.

The accompanying drawings illustrate the invention.

Fig. 2 is an enlarged fragmental detail of the pneumatic connection shown in Fig. 1.

Fig. 3 is an enlarged detail of the trolley wheel and the upper end of the trolley pole with the trolley pole head in section. The trolley wheel, harp and one of the brushes are shown in elevation free from restraint so that the relief valve is open.

Fig. 4 is a sectional detail of the trolley harp and connection on line $x^4$, Fig. 3, the trolley wheel being intact.

Figure 1:
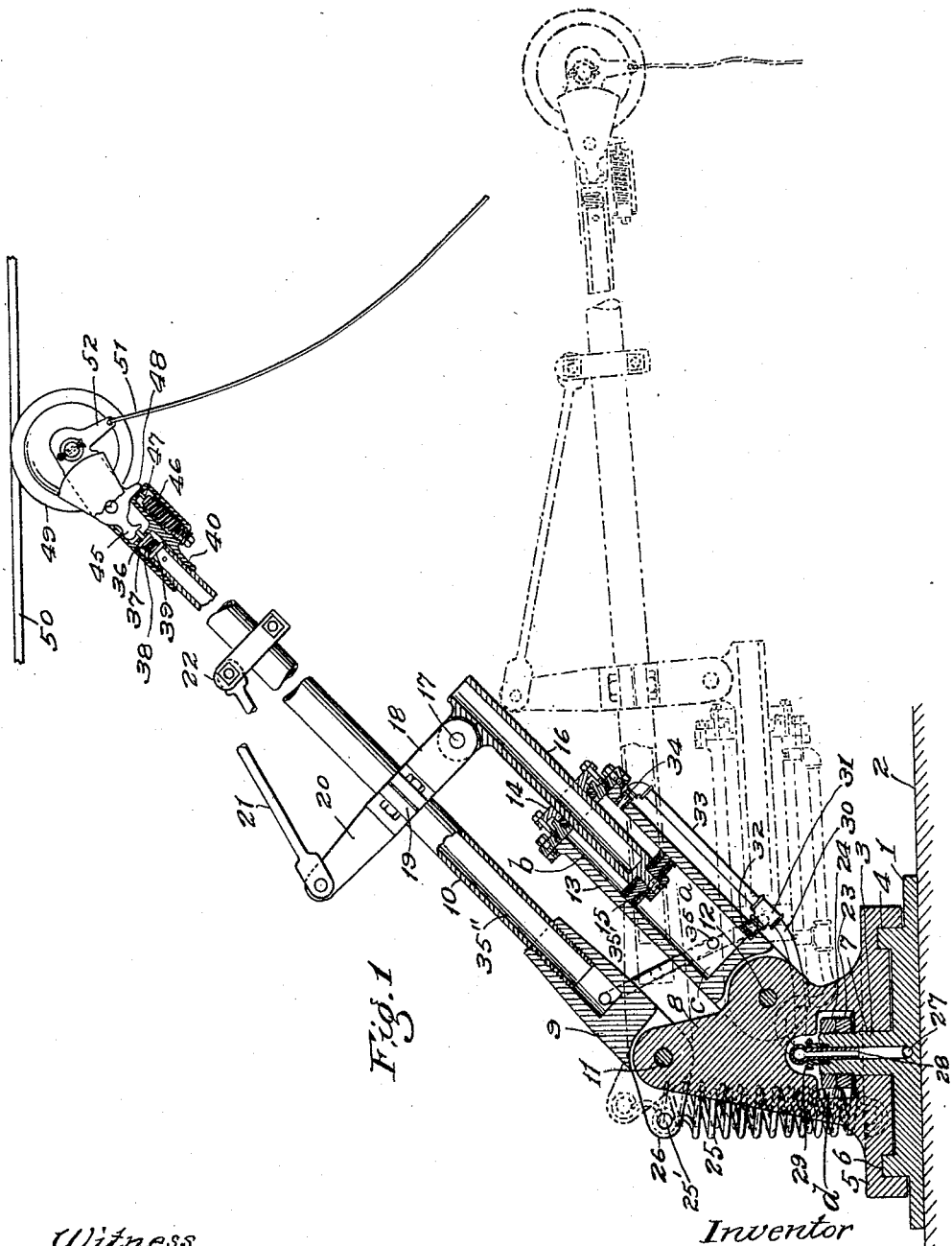
Figure 1 is a fragmental elevation partly in section of a pneumatic retrieving trolley constructed in accordance with this invention and in operative position. A dot-and-dash position shows the trolley in a possible fully retracted position.

The sides of the appliance are of like construction except that only one air supply line and one connecting air line are employed; there being a pair of counter-balance springs and short arms for the pole; only one of each of said springs and arms being shown on account of the nature of the views.

The base plate 1 is secured to the top of the car 2 by any usual suitable means and is provided with a central pivot post 3 and an annular bead 4 upon which is pivoted a trolley base 5 having an annular groove 6 and a central bore 7 to accommodate the annular bead 4 and the post 3. Said base is provided with a standard 8 to which are pivoted a trolley pole and a pneumatic controller therefor. The trolley pole or arm comprises the knuckle 9 and the trolley pole section 10 fixed to said knuckle, said knuckle being pivoted to the standard by horizontal pivot 11. A second horizontal pivot 12 parallel to the pivot 11 and located at a lower level, pivotally connects to said standard a telescoping extensible pneumatic support and retractor that is made up of a cylinder 13 having a gland 14, and a piston head 15 and rod 16 working in the cylinder and gland. The piston head 15 separates the bore of the cylinder into lower and upper chambers *a*, *b*. Said piston rod is pivotally connected by a pin 17 to the piston rod bracket 18 fixed to the trolley arm; said bracket being clamped by a clamp 19 to the trolley pole 10 and stayed by a stay arm 20 projecting from the opposite side of said pole and connected by a stay 21 to a lug 22 that is connected to the trolley pole at a distance from the clamp 19. The trolley base is held in place on the base plate 1 by any suitable means as the nuts 23, 24 on the post 3 within an opening *d* extending through the standard; and the trolley arm is held in elevated position by the trolley pole spring 25 and the pneumatic support jointly. Spring 25 is connected at its lower end to the base and at its upper end to the short arm 26 of the knuckle 9 which carries the trolley pole section 10. The spring 25 is composed of a pair of helicals connected to a pin 25′ passing through a pair of arms 26 that constitute the short arm of the trolley pole mounted on pivot 11.

The cylinder 13 of the telescopic support is supplied with air from an air line comprising an air way 27 in the base, an air connection 28 swiveled in the base and secured by a gland 29 and connected by a flexible tube 30 with the air fitting 31 in the form of a T which communicates by a restricted inlet port 32 with the lower chamber *a* of the cylinder bore, close to the lower end thereof below the lower face of the piston head; and also communicates by a pipe 33 and retracting port 34 with the upper chamber *b* of the other end of the cylinder bore above the upper face of the piston head. The retracting port 34 is also preferably restricted so as to avoid sudden and violent completion of the retractive action.

The area of the lower face of the piston head inside the cylinder is greater than the area of the upper face of the piston head exposed to the air in the inside of the upper end of the cylinder for the reason that the piston rod 16 takes up a considerable portion of said cylinder bore and passes to the atmosphere so that if the intensity of the pneumatic pressure in the cylinder is equal at opposite ends of the bore the total effective pressure on the under face of the piston head will exceed that upon the upper face of said head.

As a result of this construction the air pressure exerted on the lower face of the piston when air is prevented from escaping from the cylinder has greater effect to force the piston head up than the pressure on the upper side has to force it down and consequently when the air pressure is confined within the trolley pole and the cylinder and the related parts, the piston rod will be driven upward and will act through the pin 17 and bracket 18 with the result that the trolley pole section is pushed upward into working position by the joint action of the air and the spring 25.

The trolley pole knuckle 9 and section 10 are hollow and are connected through exhaust port 35 and flexible air pipe connection 35′ with the lower half of the cylinder bore above the restricted inlet port 32, so that there is a zone or pocket *c* below the exhaust port 35 wherein the air pressure from restricted inlet port 32 is positively confined to form an air cushion for the downwardly-moving piston head when said head passes the exhaust port 35.

The trolley pole air passage 35″ leads to a relief port 36 that is closed by valve 37 which is normally actuated by relief valve spring 38 resting on a perforated valve-guide and support 39 that allows the air to pass freely to the relief port. The pole head 40 has side prongs or guides 41 between which the shank 42 of the trolley harp is pivoted by the harp pin 43. Said trolley pole head fits upon the trolley pole air tight and is provided with the port 36 through which a valve pin 44 projects to be acted upon by the cam 45 on the lower end of the harp shank to unseat the valve when the trolley harp is bent upward. A harp spring 46 of greater power than the valve spring 38 acts through the floating pin 47 and upon the shoulder 48 projecting from the harp and thereby forces the upper wheel carrying end of the harp upward to force the wheel 49 toward the trolley wire 50 and also to force the cam 45 to actuate the valve pin 44 and thereby unseat the valve. By reason of the harp spring 46, the valve 37 is always unseated except when the trolley wheel 49 or harp 42 is restrained as by the trolley wire 50 or line 51; and consequently the force of the trolley pole spring 25 is exerted at the time of such restraint to bend the joint between the trolley pole head and the harp and thus to remove the cam from the valve pin; thus allowing the spring 38 to close the relief valve.

When the relief valve is thus closed the air pressure acting upon the unequal opposite sides of the piston head forces the piston head upward in the cylinder 13 and this force plus that of the spring 25 maintains the trolley pole in working position as long as the trolley wheel is restrained by the trolley wire so as to allow spring 38 and the air pressure to hold valve 37 closed.

The trolley pole spring 25 is of such strength, that when its action is not interfered with it will uphold the trolley pole and will hold the trolley wheel against the wire 50 with sufficient force to compress the trolley harp spring 46 that is second thereto in strength and thus allow the relief valve spring 38, which is the third spring in strength, to close the valve. When the strength of said spring 25 is supplemented by the air in the cylinder the trolley pole is upheld with the requisite working force. In case the trolley wheel becomes de-wired or from any condition or cause whatever the trolley wheel is freed from restraint, the trolley spring 46 instantly acts to throw the trolley harp upward thereby causing the cam 45 to open relief valve 37 whereupon air escapes through the trolley pole and the flexible connection, from the lower end of the cylinder; thus reducing the pressure of air on the under side of the piston. The restricted port 32 which supplies air to the lower end of the cylinder being so much smaller than the relief port 36; and the retracting air port 34 of the upper end of the cylinder also being restricted, the expansion of the air in the end *b* of the cylinder, suddenly starts the piston down and this expansion is followed up more or less slowly by air entering through the restricted air port 34 thus continuing the downward movement with less than the initial force until the piston covers the exhaust port whereupon the air entering the lifting port is confined in zone *c* thus producing an air cushion to support the piston head. As the piston head is driven down and the piston rod 16 is thereby retracted, thus reducing the length of the telescopic connection between the bracket 18 and the pivot 12, the trolley pole is drawn toward the dot-and-dash position shown in Fig. 1, and this is effected against the force of the trolley spring 25 and trolley harp spring 46.

Notwithstanding this action, the inlet port 32 remains uncovered, and compressed air continues to enter the zone or pocket *c* and the piston is thereby lifted until the exhaust port 35 is slightly uncovered thereby allowing such leakage that the forces reach equilibrium and the pole comes to rest somewhat aslant.

For convenience of illustration in Fig. 1 the trolley pole is shown by the dot-and-dash lines as retracted farther than the position in which it would be thus supported in actual working.

A line 51 is attached to a finger 52 of the trolley harp whereby the conductor can draw down the harp to compress the spring 46 and swing the cam away from the valve pin thus to allow the valve to seat; whereupon the pressure of air on the under side of the piston head again becomes effective to overcome that on the upper side, and the trolley pole is again lifted to working position.

Any tendency to leak past the piston head when in operation is minimized for the reason that the intensity of the pressure at such time is practically the same on both sides of the piston head and the only leakage to atmosphere must be either around the piston rod or through the relief port and these being small openings are easily guarded against leakage.

The trolley wheel 49 rotates on the axle 53 that is fastened by pins 54 in seats 55 therefor in prongs of the pivoted harp 42.

Current is taken from the wheel 49 by spring brushes 56 passing through holes 57 in the prongs 41 of the trolley pole head 40 and held by harp pin 43 between the harp and the head. Current is taken from said brush in any usual and convenient way well understood in the art.

It is thus seen that the trolley pole and its support are arranged in parallelism with each other and are pivotally connected together and to a support, and that one of them is extensible and is controlled by pneumatic pressure operating upon unequal faces of extensible element, and that the means for applying pneumatic pressure to extend the extensible element is made ineffective when the trolley wheel is unrestrained; and that the retraction of the trolley pole is effected by means for maintaining at that time the effectiveness of the means for retracting the extensible element.

It is also seen that since the means such as the relief valve 36 and the other elements coöperating therewith are mounted on the free end of the arm 10 so that said means move with the arm, liability of disabling the trolley pole retrieving apparatus through bending of the pole or through bending connections between the same and stationary parts is avoided.

I claim:—

1. A base, a trolley pole pivoted to the base, a cylinder pivoted to the base below the trolley pole, a double-acting piston in the cylinder and connected to the trolley pole, pneumatic means for balancing the piston, said pneumatic means including a valve which opens when the trolley pole flies up.

2. A base, a trolley pole pivoted to the base, a cylinder pivoted to the base below the trolley pole and substantially parallel therewith, a double-acting piston in the cylinder and connected to the trolley pole, pneumatic means for balancing the piston, said pneumatic means including a valve held closed by the resistance to the up-pressure of the trolley pole and adapted to fly open when this resistance ceases, thereby unbalancing the piston and lowering the trolley pole.

3. A base, a trolley pole pivoted to the base, a cylinder pivoted to the base, a double-acting piston in the cylinder and connected to the trolley pole, pneumatic means for balancing the piston, a trolley, a harp pivotally connecting the trolley to the trolley pole, said pneumatic means including a valve held closed by the harp when the trolley is against a trolley wire, said valve flying open when the trolley leaves the wire, thereby unbalancing the piston and lowering the trolley pole.

4. A cylinder, a piston working therein and subject to air pressure on its opposite faces; said faces being unequal; means to supply air pressure to the smaller of said faces; restricted means to supply air to the larger face of the piston and means to release air from the larger face of the piston so that the air pressure on the smaller face may move the piston in one direction when the air is released; and whereby the air pressure on the larger face may move the piston in the other direction when the air is confined.

5. The combination with a standard of a trolley pole arm pivoted to the standard; a cylinder pivoted to the standard; a piston working in the cylinder and having unequal faces; means to supply air pressure to the smaller face of the piston to depress the arm; means to apply air pressure to the larger face of the piston to move the piston toward its smaller face to raise the arm; a relief valve to release air from the larger face; a trolley harp pivoted to the arm and connected to open the valve when unrestrained; and means to close the valve when the trolley harp is restrained.

6. The combination with a trolley pole, of a cylinder; means pivoting the pole and cylinder on parallel axes; a piston head having unequal faces working in the cylinder and pivotally connected with the trolley pole; means to apply compressed air to the smaller face of the piston, restricted means to apply compressed air to the larger face of the piston; a trolley wheel harp pivoted to the trolley pole; and a relief valve operated by said harp to control the air pressure in the cylinder.

7. A base, a trolley pole pivoted to the base, a cylinder pivoted to the base, a double-acting piston in the cylinder and connected to the trolley pole, pneumatic means for balancing the piston, a trolley, a harp pivotally connecting the trolley to the trolley pole, said pneumatic means including a valve held closed by the harp when the trolley is against a trolley wire, said valve flying open when the trolley leaves the wire, thereby unbalancing the piston and lowering the trolley pole so that the retraction of the trolley wheel is rapid at the instant the trolley wheel is dewired and diminishes as the pole descends, changing from a downward thrust upon the pole to a resilient support therefor, all of which is accomplished by the same source of air that is depended upon to support the trolley pole in its running position.

In testimony whereof I have hereunto set my hand at Los Angeles, California, this 13th day of September, 1915.

ALBERT M. EATON.

Witness:
JAMES R. TOWNSEND.

Copies of this patent may be obtained for five cents each, by addressing the "Commissioner of Patents, Washington, D. C."